Figure 1:
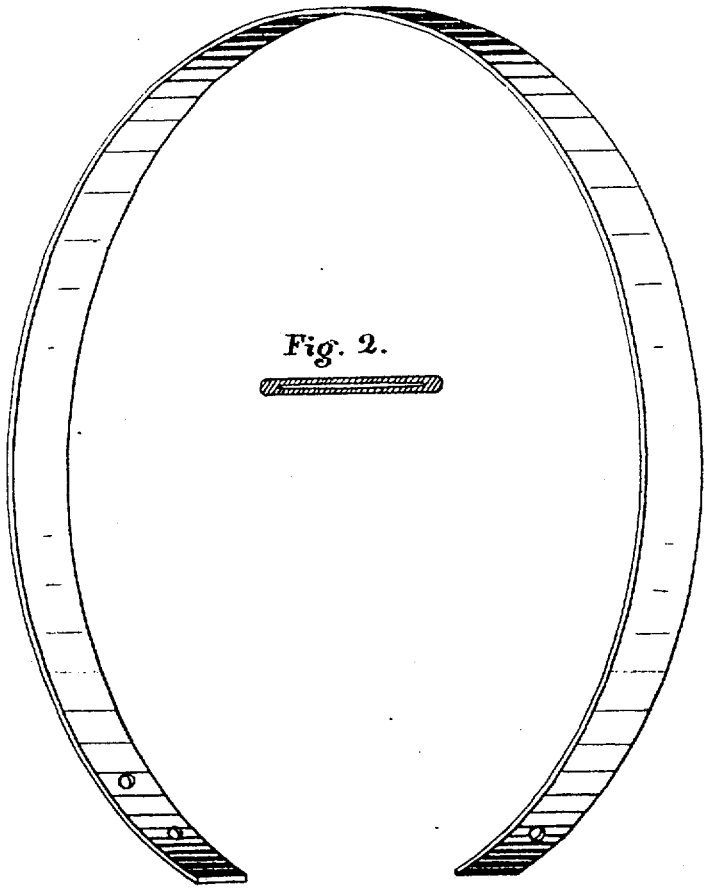

J. W. RIGGS.

Improvement in Truss Springs.

No. 4,589. Reissued Oct. 10, 1871.

Witnesses.
Orlando L. Wieting.
Chas. C. Neumann.

Inventor.
J. W. Riggs.
By Mills N. Lyons.
Attorney.

AM. PHOTO-LITHOGRAPHIC CO. N.Y. (OSBORNE'S PROCESS)

UNITED STATES PATENT OFFICE.

JOHN W. RIGGS, OF BROOKLYN, NEW YORK, ASSIGNOR OF ONE-HALF INTEREST TO JOHN J. DIEFENDORF.

IMPROVEMENT IN TRUSS-SPRINGS.

Specification forming part of Letters Patent No. 22,674, dated January 18, 1859; reissue No. 4,589, dated October 10, 1871.

*To all whom it may concern:*

Be it known that I, JOHN W. RIGGS, of Brooklyn, county of Kings, State of New York, have invented a certain new and Improved Spring for Trusses; and I specify the following to be a full, clear, and exact description of the same, such as will enable others skilled in the art to make and use the same, reference being had to the accompanying drawing forming part of this specification.

My invention relates to the manner of preparing the springs for use in body-trusses of any nature where the spring is to be used adjacent to the body; and, if unprotected, would soon be destroyed from injurious effects of perspiration; and possessing other qualities hereinafter mentioned. My invention consists in taking steel springs, which, for trusses of the same size, may be of equal weight and elasticity, and forming therefrom springs of different strength and elasticity by coating them with rubber in plastic form, some with more and others with less, according to the strength desired. This rubber is then vulcanized or made hard, and this coating may be of any other similar material which will effect the same purposes. Where springs of this nature are employed occasion frequently requires a diminution or increase of pressure on the part affected, which can be readily attained, owing to the above-mentioned property possessed by the spring. The strength of the original metal springs is uniform, and they can be adapted to trusses of any required strength by increasing or diminishing the amount of rubber. The spring can be claened at any time with water when it becomes foul from dirt or bodily excretions, obviating the expense of renewal; as, in cases where the metal spring is not thus protected, it becomes rusted by perspiration, or becomes too offensive to be longer worn. The spring, possessing little weight, is not oppressive to the wearer. The springs are pierced with holes at the extremities to facilitate attaching other appliances.

The drawing is not intended to show the only shape of the springs when manufactured; they may be suited to every variety of body-trusses.

Figure 1 represents a spring covered with this hard-rubber coating. Fig. 2 represents, in enlarged form, a cross-section of the spring, showing the interior metal spring covered on the outside with hard rubber.

I do not claim, generally, the application of hard rubber to hard metal.

What I claim as new, and desire to secure by Letters Patent, is—

As a surgical appliance, a steel spring covered with vulcanized India rubber.

J. W. RIGGS.

Witnesses:
JAS. O. RIGGS,
B. STERN.

(156)